April 29, 1924.

G. F. PHILLIPS ET AL

HEADLIGHT ATTACHMENT

Filed Dec. 8, 1923

1,491,882

G. F. Phillips.
J. McMahan.

INVENTOR

BY Victor J. Evans.

ATTORNEY

WITNESS:

Patented Apr. 29, 1924.

1,491,882

UNITED STATES PATENT OFFICE.

GEORGE F. PHILLIPS AND JOSEPH McMAHAN, OF PADUCAH, KENTUCKY.

HEADLIGHT ATTACHMENT.

Application filed December 8, 1923. Serial No. 679,436.

*To all whom it may concern:*

Be it known that we, GEORGE F. PHILLIPS and JOSEPH McMAHAN, citizens of the United States, residing at Paducah, in the county of McCracken and State of Kentucky, have invented new and useful Improvements in Headlight Attachments, of which the following is a specification.

An object of this invention is the provision of a simple means for dimming the headlights of automobiles or like vehicles.

A further object is to produce a device of this character which may be readily arranged upon the headlamps of an automobile, and which includes a pair of connected dimmer shields pivotally supported on the rims of the headlights, connected together, and simultaneously operated by a rack lever engaged in the eye of a clamp secured to one of the uprights for the windshield of the automobile and consequently arranging the lever in convenient position for operation by the driver of the machine so that the dimmer shields may be retained at any desired angle with respect to the headlights.

The drawings, accompanying and forming part of this application, illustrate a practical embodiment of the improvement, and wherein:—

Figure 1:
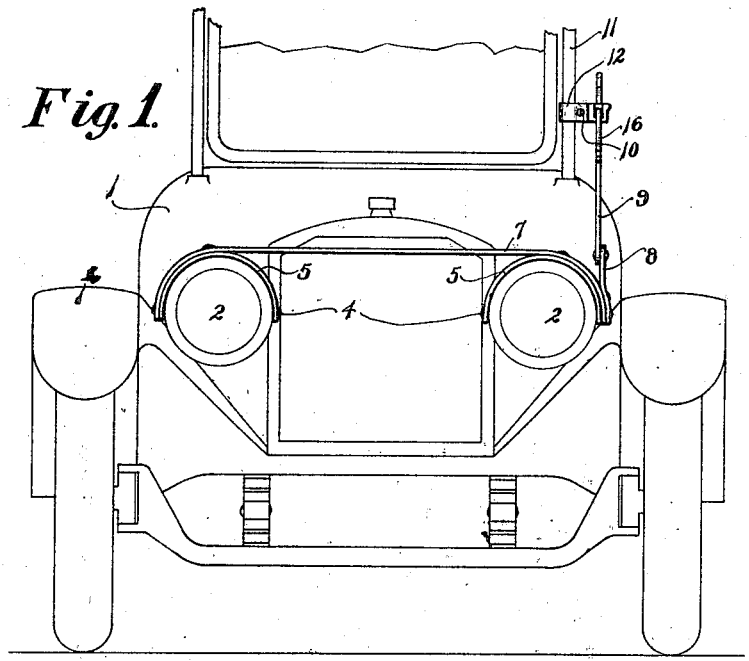
Figure 1 is a front elevation of an automobile illustrating the application of the improvement thereon.
Figure 2:
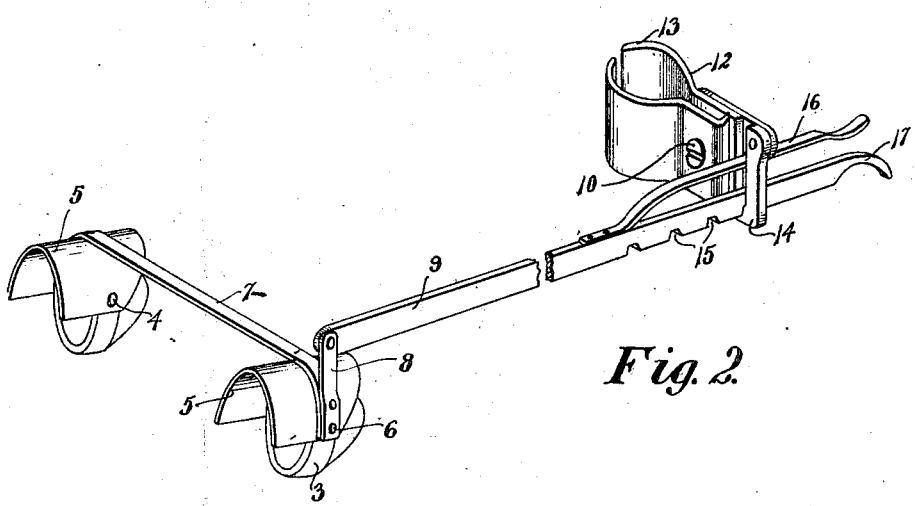
Figure 2 is a perspective view of the improvement.

In the drawings, the numeral 1 designates a conventional form of automobiles, the same being provided with the usual headlights 2.

Preferably, in carrying out our invention we provide the removable rims 3 for the headlight bodies with oppositely arranged depressions which are designed to receive therein pivots 4, on the inner or confronting faces of the arched dimmer shields 5, and likewise pivots 6 provided upon the ends of the strap 7 which connect the opposed dimmer shields 5. The strap 7 has its ends rounded over the outer rounded faces of the shields, one of said ends being extended upwardly, as indicated by the numeral 8. To this extension 8 there is pivoted the operating lever 9.

Adjustably secured by means 10 on one of the uprights 11 for the windshield of the automobile 1, there is a clamp 12. The clamp is substantially U-shaped in plan, having one of its parallel arms, however, provided on its outer edge with an inturned lip 13. The outer connecting element for the arms of the clamp is formed with an eye 14. The lever 9 has on its under face a rack surface 15 engageable with the lower portion of the eye 14, the said lever passing through the said eye. On the upper straight edge of the lever there is secured one end of an arched spring 16 which, contacting with the upper portion of the eye 14, forces the said lever downwardly to bring a notch on its rack surface into the lower portion of the said eye. The inner and free end of the lever is formed with a handle portion 17, as is that of the spring and these handle portions are within convenient grasp of the operator of the machine. The lever 9, after disengagement with the eye 14, is moved longitudinally in either direction and the dimmer shields are tilted to different angles accordingly. A release of the handle of the lever and that of the spring causes the latter to influence the lever to bring its rack surface again into engagement with the eye, thus automatically locking the shields at such angles.

Our improvement is of an extremely simple nature, may be cheaply manufactured, readily attached, easily and conveniently operated and profitably marketed at a cheap selling price.

Having described the invention, we claim:—

A dimming device for the headlights of automobiles, in which the rims for the headlight casings have opposed depressions, comprising arched dimmer shields having trunnions received in said depressions, a connecting strap for the shields rounded over the outer sides thereof and through which the outer trunnions pass, said strap having one of its ends continued to provide an upstanding portion, a rack lever pivoted thereto and extended toward the rear of the automobile, a clamp adjustably secured to one side of the supporting frame for the windshield, said clamp having an outer eye through which the lever passes, and an arched spring having its ends fixed on the upper edge of the lever contacting the eye for forcing the rack surface thereof to engage the lower portion of said eye and to hold the lever from accidental movement.

In testimony whereof we affix our signatures.

GEORGE F. PHILLIPS.
JOSEPH McMAHAN.